United States Patent
Brennan et al.

(10) Patent No.: US 11,133,625 B2
(45) Date of Patent: Sep. 28, 2021

(54) SWITCHED POWER OVER ETHERNET CONNECTOR

(71) Applicant: Sentinel Connector Systems, Inc., York, PA (US)

(72) Inventors: Robert Brennan, York, PA (US); Justin Wagner, York, PA (US)

(73) Assignee: Sentinel Connector Systems, Inc., York, PA (US)

( * ) Notice: Subject to any disclaimer, the term of this patent is extended or adjusted under 35 U.S.C. 154(b) by 0 days.

(21) Appl. No.: 16/717,874

(22) Filed: Dec. 17, 2019

(65) Prior Publication Data

US 2020/0358229 A1 Nov. 12, 2020

Related U.S. Application Data

(63) Continuation of application No. 15/893,083, filed on Feb. 9, 2018, now Pat. No. 10,547,146.

(Continued)

(51) Int. Cl.
*H01R 13/703* (2006.01)
*H01R 13/627* (2006.01)
*H01R 43/26* (2006.01)
*H01R 24/64* (2011.01)

(Continued)

(52) U.S. Cl.
CPC ......... *H01R 13/7036* (2013.01); *G06F 1/266* (2013.01); *H01R 13/6271* (2013.01);

(Continued)

(58) Field of Classification Search
CPC ............ H01R 2103/00; H01R 13/7032; H01R 13/703; H01R 13/7031; H01R 13/6616;

(Continued)

(56) References Cited

U.S. PATENT DOCUMENTS 5,470,251 A * 11/1995 Sano .................... H01R 13/641
439/489
6,074,256 A * 6/2000 Arnett ................. H04M 1/0293
200/51.06

(Continued)

FOREIGN PATENT DOCUMENTS

| CN | 1393715 A | 1/2003 |
| CN | 102457786 A | 5/2012 |
| WO | 2016133898 | 8/2016 |

OTHER PUBLICATIONS

International Search Report dated May 24, 2018 issued in connection with PCT/US2018/017667; 4 pages.

(Continued)

*Primary Examiner* — Gary F Paumen
(74) *Attorney, Agent, or Firm* — KCO Legal, Inc.

(57) ABSTRACT

An arc prevention system including a jack having a receptacle, a modular plug sized to be positioned in the receptacle of the jack, the modular connector including, a plurality of contacts, with at least two of the contacts creating an energized electrical path with an external power source in electrical communication with the external power source, a latch extending from a top surface of the modular plug, a switching unit positioned on the latch, a control circuit in electrical communication with the switch and the at least two energized contacts, where the electrical path between the control circuit and the switching unit is not energized, and the control circuit adjusts the energized electrical path to a predetermined electrical level.

20 Claims, 3 Drawing Sheets

Related U.S. Application Data

(60) Provisional application No. 62/457,452, filed on Feb. 10, 2017.

(51) Int. Cl.
*H01R 13/71* (2006.01)
*G06F 1/26* (2006.01)
*H04L 12/10* (2006.01)
*H01R 107/00* (2006.01)
*H01R 13/66* (2006.01)

(52) U.S. Cl.
CPC .......... *H01R 13/703* (2013.01); *H01R 13/71* (2013.01); *H01R 24/64* (2013.01); *H01R 43/26* (2013.01); *H04L 12/10* (2013.01); *H01R 13/6683* (2013.01); *H01R 2107/00* (2013.01)

(58) Field of Classification Search
CPC .......... H01R 13/6658; H01R 13/6625; H01R 13/2442; H01R 13/514; H01R 13/7036; H01R 13/6271; H01R 13/71; H01R 13/6683; H01R 23/025; H01R 43/26; H01R 2107/00; H01R 24/64; H01H 36/00–0066; G06F 1/266; H04L 12/10
USPC ............ 439/188, 620.21–620.23, 626; 335/151–154, 205–207; 200/51 R, 51.09, 200/51.12
See application file for complete search history.

(56) References Cited

U.S. PATENT DOCUMENTS

| | | | |
|---|---|---|---|
| 7,384,300 B1* | 6/2008 | Salgado | H01R 13/7035 439/489 |
| 7,537,468 B1 | 5/2009 | Huang | |
| 7,563,116 B2* | 7/2009 | Wang | H01R 13/703 439/188 |
| 7,641,489 B1 | 1/2010 | Hsu | |
| 7,967,620 B1 | 6/2011 | Baldwin | |
| 8,502,092 B2* | 8/2013 | Chou | H01H 25/065 200/4 |
| 10,547,146 B2* | 1/2020 | Brennan | H01R 24/64 |
| 2002/0039851 A1 | 4/2002 | Mou | |
| 2005/0201190 A1 | 9/2005 | Kowalski | |
| 2007/0134986 A1* | 6/2007 | Hemmah | H01R 13/66 439/620.21 |
| 2010/0130043 A1 | 5/2010 | Wang | |
| 2010/0197156 A1 | 8/2010 | Chen | |
| 2011/0183536 A1 | 7/2011 | Wang | |
| 2012/0099742 A1 | 4/2012 | Edeler | |
| 2012/0190241 A1* | 7/2012 | Chang | H01R 24/64 439/620.23 |
| 2014/0001166 A1 | 1/2014 | Peters | |
| 2014/0011382 A1 | 1/2014 | Taylor | |
| 2014/0057471 A1* | 2/2014 | Lee | H01R 13/7032 439/188 |
| 2014/0073158 A1 | 3/2014 | Hong | |
| 2015/0014414 A1 | 1/2015 | Giebel | |
| 2016/0254620 A1* | 9/2016 | O'Young | H01R 29/00 439/76.1 |
| 2017/0003459 A1 | 1/2017 | Takeuchi et al. | |
| 2018/0048098 A1 | 2/2018 | Royer | |

OTHER PUBLICATIONS

Written Opinion dated May 24, 2018 issued in connection with PCT/US2018/017667; 9 pages.

* cited by examiner

SWITCHED POWER OVER ETHERNET CONNECTOR

CROSS-REFERENCE TO RELATED APPLICATIONS

This is a continuation of U.S. application Ser. No. 15/893,083, filed Feb. 9, 2018, which claims the benefit of and priority from U.S. Application Ser. No. 62/457,452, filed Feb. 10, 2017 which is hereby fully incorporated herein by reference.

BACKGROUND OF THE DISCLOSURE

There are several common techniques for power over Ethernet ("PoE") that have been developed and used in practice. The Institute of Electrical and Electronics Engineers ("IEEE") established and continue to establish various standards for PoE, namely, IEEE 802.3 and more specifically 802.3af, 802.3at, 802.3bt, etc. The IEEE standards provide for signaling between the power sourcing equipment ("PSE") and powered device ("PD").

PSE is a device such as a network switch that provides (or sources) power in common mode over two or more of the differential pairs of wires found in the Ethernet cable. A PD is a device powered by a PSE and thus consumes energy. Examples include wireless access points, Internet Protocol ("IP") phones and cameras, wireless access points, etc.

An energized PoE electrical path is not "closed" or "made," electrically coupled or in electrical communication when the PD contacts physically engage the PSE contacts (i.e., power does not pass from the PSE to the PD, or vice versa, simply by engagement of the respective contacts), rather the standards provide a protocol with stages of powering up an energized PoE electrical path. Control circuitry associated with the PSE functions in accordance with certain instructions to perform a series of steps. First, the PSE detects the classification resistance of the PD. Second, the PSE outputs an initial classification voltage and reads the load at the PD to confirm correct classification of PoE. Third, the PSE outputs a ramping startup voltage so that current will begin to flow. Fourth, the PSE supplies a normal operating voltage and current flow to the PD.

The maximum continuous output power a PSE can sink per Ethernet cable was originally the 802.3af PoE standard with −13 W that would be available at the PD input's RJ-45. Since then, the market has continued to demand more power. So, in 2009, the IEEE standard was revised and released IEEE 802.3at (also known as PoE+), which increased the maximum PD power level to 25.5 W. Currently, the IEEE 802.3bt (also known as PoE++ or 4PPoE), will provide PDs with up to 71 W of power (Type 3) or up to 90-100 W (Type 4), where each twisted pair will need to handle a current of up to 600 mA (Type 3) or 960 mA (Type 4). With more power, developers can easily add more features and upgrade existing products. It is conceivable that the current maximum PSE power outputs will continue to rise (for example, 60V at 2 A (120 W) has been proposed) as further developments are made related to PoE.

BRIEF SUMMARY OF THE DISCLOSURE

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter.

The present disclosure generally relates to modular jack and plug connectors. More particularly, the present disclosure relates to switched modular jack and plug connectors for advantageous use in connection with PoE applications.

Generally, a modular connector, as disclosed herein, may include a pair of energizable contacts that facilitate an electrical path that may be de-energized by a switch component.

In one aspect of the present disclosure, a modular connector may include a plurality of contacts including a pair of the contacts that are energizable by an electric power source and facilitate an energized electrical path. A switching component may be in electrical communication with the pair of contacts such that the pair of contacts is de-energized when the switching component is disposed in an open state.

In another aspect of the present disclosure, a modular connector assembly may include a jack with a plurality of jack contacts, a control circuit in electrical communication with an electrical power source to energize a pair of the jack contacts, a plug with a plurality of plug contacts engaging the jack contacts, wherein a pair of the plug contacts engage the pair of jack contacts to define an energized electrical path. A switching component, in a closed state, may be in electrical communication with the control circuit and configured to move to an open state upon relative movement between the plug and the jack so that the electrical path is de-energized while the pair of jack contacts and the pair of plug contacts remain engaged.

In other aspects of the present disclosure, a power over Ethernet assembly may include a power source equipment including a jack with a plurality of jack contacts, a control circuit in electrical communication with an electrical power source to energize a pair of the jack contacts, a powered device including a plug with a plurality of plug contacts engaging the jack contacts, wherein a pair of the plug contacts engage the pair of jack contacts to define an energized electrical path. A switching component, in a closed state, may be in electrical communication with the control circuit and configured to move to an open state upon relative movement between the plug and the jack so that the electrical path is de-energized while the pair of jack contacts and the pair of plug contacts remain engaged.

In a still further aspects of the present disclosure, a method of preventing an arc between a powered device and a connected power source equipment may include moving a plug of the powered device, actuating a switching component in response thereto, and de-energizing the electrical path in response thereto. Preferably, in an embodiment, a control circuit may be in electrical communication with an electrical power source, an energized electrical path may be defined among the electrical power source, a pair of contacts of the power source equipment, and a pair of contacts disposed of the powered device, and the switching component may be in electrical communication with the control circuit and connected to the jack.

In other aspects of the present disclosure, the switching component may be selected from the group consisting of a micro-switch, a nano-switch, an optical switch, a proximity switch, a reed switch, an infra-red switch, a tactile switch, and a pressure switch; the receptacle may include an opening, a back wall opposite the opening and a plurality of side walls that each extend between the opening and the back wall and the switching component is disposed on one of the back wall and side walls; the switching component may be responsive to movement of the plug; the switching component may be a pressure switch disposed on a side wall of the receptacle configured for engagement with a latch portion of the plug; the switching component may be a pressure sensor disposed on a side wall of the receptacle configured for engagement with a latch portion of the plug; the switching component may be selected from the group consisting of a switch element and a sensor; the switching component may be a sensor in communication with a switch element; the switching component may be a pressure switch disposed the plug configured for engagement with a latch portion of the plug; the switching component may be a pressure sensor disposed on the plug configured for engagement with a latch portion of the plug; and the switching component is disposed on the plug.

BRIEF DESCRIPTION OF THE SEVERAL VIEWS OF THE DRAWINGS

The foregoing summary, as well as the following detailed description of the disclosure, is better understood when read in conjunction with the appended drawings. For the purpose of illustrating the disclosure, exemplary constructions of the inventions of the disclosure are shown in the drawings. However, the disclosure and the inventions herein are not limited to the specific methods and instrumentalities disclosed herein.

DETAILED DESCRIPTION OF THE INVENTION

Figure 1:
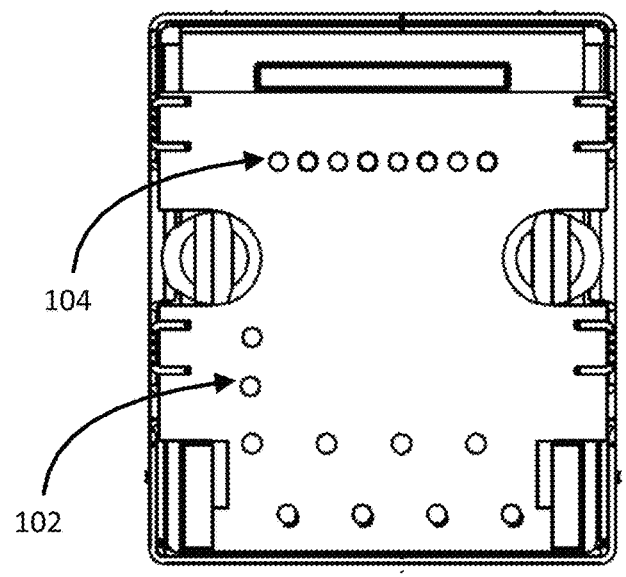
FIG. 1 depicts a window in a left side of the jack opening where a switch is positioned.

The following disclosure as a whole may be best understood by reference to the provided detailed description when read in conjunction with the accompanying drawings, drawing description, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

While there is a protocol to "close" or "make" an energized PoE electrical path (i.e., passing power such that there is electrical communication or electrical coupling) only after engagement of the contacts of the PD with the PSE, there is no protocol to "open," "break," or de-energize the PoE electrical path, except by control circuitry detection after disengagement of the respective contacts. This is a major disadvantage, oversight and downfall of the standards and prior art since it has been observed that upon disengagement of the PD contacts from the PSE contacts there is a brief electric discharge in the form of an arc (i.e., a parting arc, break arc or opening arc) that occurs as the energized PoE electrical path is opened or broken while current is flowing. The surge of current melts the contacts at the last point of engagement and causes a brief parting arc as a gap develops between the contacts. As current flows through the extremely small point in the contacts, it heats up due to a small amount of resistance. As is known, when current moves through something that has resistance, it dissipates energy in the form of heat. More current or more resistance dissipate more heat. Current flowing through a small point causes temperatures to rise to many thousands of degrees. The point can become so hot that the surrounding air is turned to plasma, and the metal on the contacts are turned to vapor. The are quenches quickly but particles of melted metal (i.e., sparks) are discharged. The high temperatures are often accompanied by the emission of light, and often sound.

While the control circuitry that manages the power up protocol also monitors for the "opening" or "breaking" of the energized PoE electrical path, it is too slow to react to prevent arcing and sparks. Currently, the control circuitry can cut power to, de-couple electrical communication, or de-energize the PoE electrical path within 15 microseconds after disengagement of the contacts. However, the first are pulse occurs within 5 nanoseconds of disengagement of the contacts and the spark discharge damages the contacts by changing the molecular structure of the contact (e.g., porosity, micro-surface alterations, etc.) leaving a "hot" spot on the contact and cold working the contact which causes higher resistance when the PD is reconnected to the PSE such that the connection is or will be no longer acceptable as per other standards existing or later developed.

Therefore, this disclosure is directed to address this discovered need in the art for a simple, effective and economical apparatus, device and method that safely and protectively "opens" or "breaks" (i.e., de-energizes) the PoE electrical path (i.e., "closed" or "made," electrically coupled or electrical communication of power) before the PD contacts are physically disconnected or disengaged from the PSE contacts, without any arcing or spark damage to such contacts.

FIG. 1 depicts a window in a left side of the jack opening where a switch, such as a surface mount switch, or the like, etc., may be disposed. If the switch is disposed on a printed circuit board, rigid or flexible, or other substrate associated with the jack (collectively, "PCB"), then a sensor in electrical communication with the switch that is disposed remote from the PCB may be used in combination with the switch to provide the intended functionality. Either the switch or the sensor will be referred to as a switching component herein. Other locations for the switch and/or sensor will be described herein. The switching component is electrically connected to or in electrical communication with the PoE channels for the jack. When the switching component 102 is engaged, made, or otherwise disposed a closed state the power to the PoE channels is connected and PoE power energizes the jack and is capable of flowing there through when matingly connected with a complementary plug. When the switching component is disengaged, disconnected, or otherwise disposed in an open state power is prevented from flowing to the PoE channels. The switching component is configured to move from the closed state to the open state in response to a movement of the plug with respect to the jack before the plug contacts disengage or disconnect from the jack contacts to prevent arcing and sparks.

The switching component can be any type or kind of switching component that would provide or facilitate the intended functionality switch including an infrared switch, reed switch or tactile switch or any related or compatible sensor. In one embodiment, the switching component deactivates or moves from the closed state to the open state in response to, in one embodiment, less than 0.01 inches of movement of the plug or any portion thereof.

Figure 2:
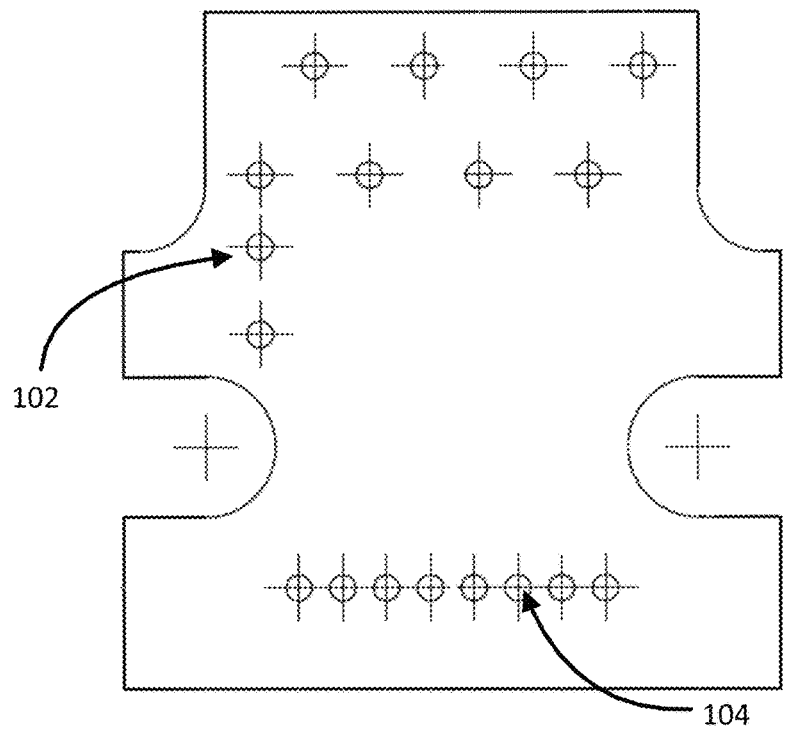
FIG. 2 depicts a bottom view of the printed circuit board for the jack in FIG. 1.

FIG. 2 depicts a bottom view of the PCB for the jack. A plug that has corresponding complementary contacts engage the jack contacts 104 such that the plug and jack contacts are in electrical communication with the switching component 102. When the plug contacts are disengaged or disconnected from the jack contacts or the plug is removed from the jack, the plug contacts are no longer in electrical communication with the switching component, and PoE power is not delivered to the plug.

Figure 3:
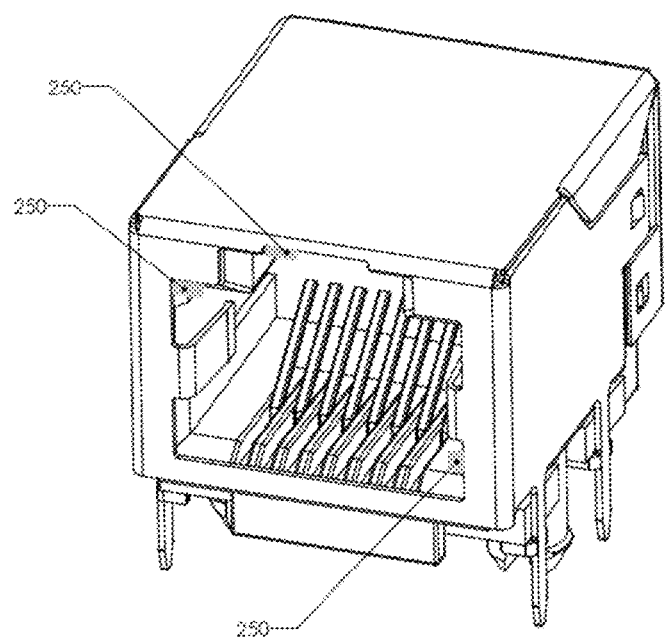
FIG. 3 depicts a front view of the jack in FIG. 1.

FIG. 3 depicts a front view of the jack showing the contacts 104 disposed in the receptacle of the jack. The switching component may be disposed anywhere in the receptacle that is advantageous in order to perform and achieve the intended functionality of this disclosure. Additionally, it is within the teachings of the present disclosure that the switching component may be disposed on the plug in any manner or location in order to determine relative movement between the plug and jack such that the intended functionality may be achieved.

Figure 4A:
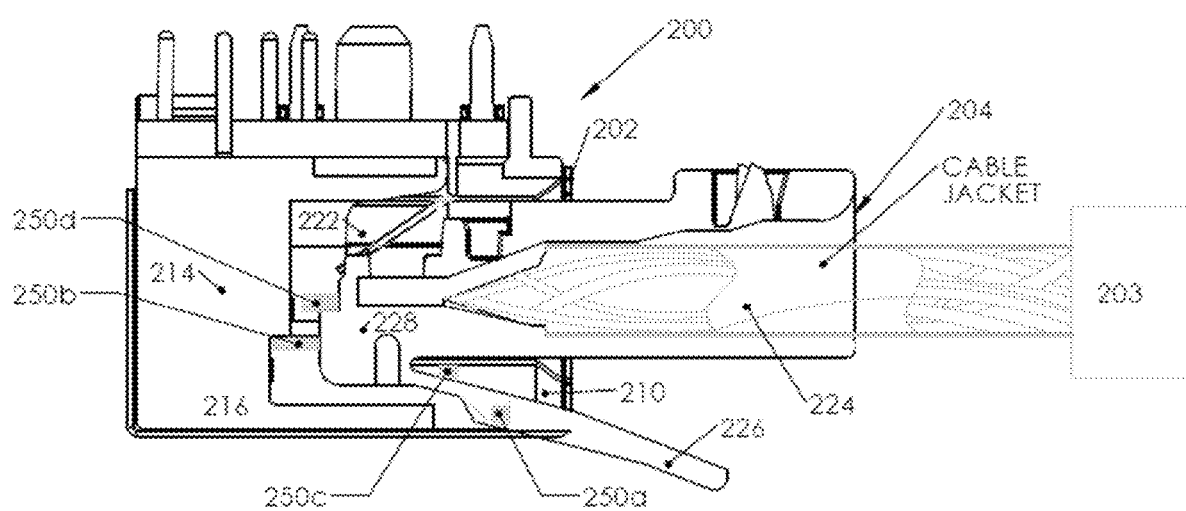
FIGS. 4a and 4b depict a side sectional view of a connected modular connector assembly.
Figure 4B:
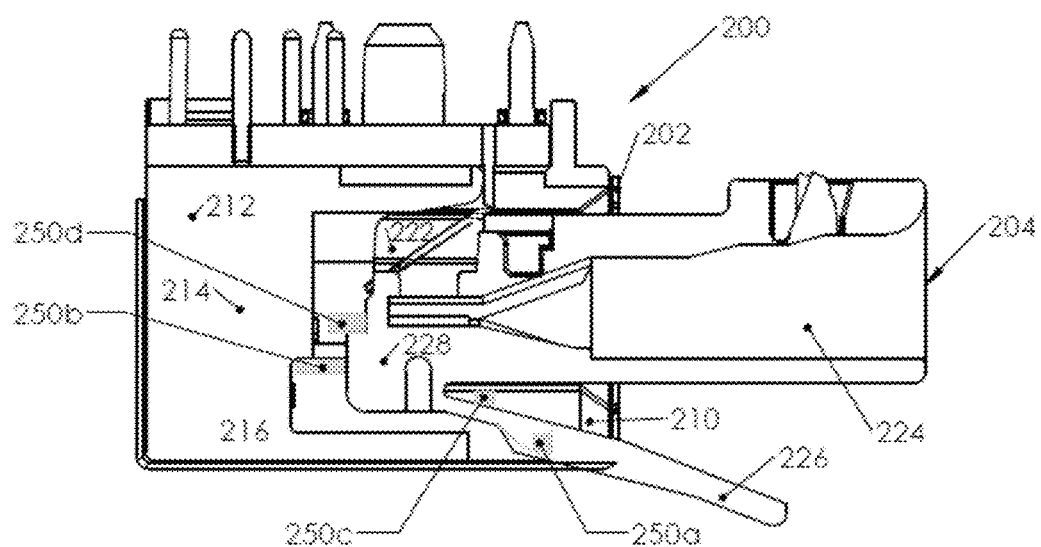

FIGS. 4a and 4b depict in one embodiment, a modular connector assembly 200 including a jack 202 having a receptacle 210 with a plurality of jack contacts 212 disposed within the receptacle 210 and a plug 204 including a plurality of plug contacts 222 that each engage corresponding complementary jack contacts 212. In another embodiment, FIGS. 4a and 4b depict a power over Ethernet assembly 200 including a power source equipment 201 including a jack 202 having receptacle 210 and a plurality of jack contacts 212 disposed within the receptacle 201 and a powered device 203 including a plug 204 received within the receptacle 210 where the plug 204 has a plurality of plug contacts 222 that each engage corresponding complementary jack contacts 212.

Preferably, a control circuit 230 is disposed in electrical communication with an electrical power source 240 so that the control circuit 230 may energize a pair of the jack contacts 212 as per the applicable standards protocol. One of ordinary skill in the art will recognize that more than one pair of jack contacts 212 may be energized and that the applicable standards protocol will control.

A pair of the plug contacts 222 are disposed to each engage one of the pair of jack contacts 212 that are energized by the control circuit 230 in order to define an energized electrical path through the assembly 200 from the electrical power source 240 to the powered device 203. Again, one of ordinary skill in the art will recognize that it is desirable for the pair(s) of plug contact 222 that may be energized match the pair(s) of jack contact 212 that will be energized, all in accordance with applicable standards.

A switching component 250 (when referenced generally or collectively, and 250a, 250b, 250c, and 250d when referenced specifically) is disposed in electrical communication with the control circuit 230 and, in this embodiment as shown in FIG. 4, is disposed in a closed state, as would be understood by one of ordinary skill in the art. Preferably, the switching component 250 may be a switch element (i.e., structure that performs the switching functionality between open state and closed state at the location of the switching component) or a sensor in communication with a switch element or switching functionality disposed in the control circuit 230 (i.e., the sensor sends a signal to the control circuit 230 switch element to perform the switching functionality).

Preferably, the switch component 250 has a normally open configuration and is responsive to movement of the plug 204 with respect to the jack 202, or relative movement there between. In one embodiment, the switching component 250 is configured to move to an open state upon relative movement between the plug 204 and the jack 202 so that the electrical path is de-energized while the pair of jack contacts 212 and the pair of plug contacts 222 remain engaged. The maximum relative movement before triggering the switching component 250 to move to the open state is no greater than the range of 0.040 inches. Accordingly, a range between 0-0.040 inches is acceptable in order to observe the advantages of this disclosure, but more preferably in the range of 0-0.020, and most preferably in the range of 0-0.005 inches to accommodate for further improvements or developments in PoE technology.

The advantages described herein may be achieved by using a switching component 250 such as a micro-switch, a nano-switch, an optical switch, a proximity switch, a reed switch, an infra-red switch, a tactile switch, a pressure switch, or any other similar switch and/or sensor that provides the intended functionality as described herein. The foregoing list is merely an example of currently know structure that will provide the intended functionality, and is not limited thereto.

In one embodiment, the switch component 250 may be disposed in or on the jack 202, and in another embodiment, the switch component 250 may be disposed in or on the plug 204. Regardless of positioning or location, the functionality is the same. Multiple locations of the switch component 250 are shown in the various drawings and shall not be limiting in any manner, as other locations may be advantages in order to provide the intended functionality. For example, the switch component 250 in the jack 202 may be disposed on a back wall 214 of the receptacle 210 (see 250b) opposite the opening of the receptacle or on one of the side walls 216 of the receptacle 210 (see 250a) that extend between the opening and back wall 214 of the receptacle 210. Switch component 250c and 250d may disposed on a body 224 of the plug 204, such as the nose (see 250d) or the top (see 250c).

In a particularly advantageous embodiment, the switching component 250 is a pressure switch 250a disposed on a side wall of the receptacle 210 configured for engagement with a latch portion 226 of the plug 204. An obvious variant, as mentioned herein, is a pressure sensor 250a disposed on a side wall of the receptacle 210 configured for engagement with a latch portion 226 of the plug 204. One of skill in the art will recognize that movement of the latch 226 is an initial movement of the plug 204 in order to achieve separation of the plug 204 from the jack 202. However, the jack contacts 212 and plug contacts 222 remain engaged during this initial movement, and will remain engaged for a pre-determination extraction distance. Preferably, the extraction distance necessary to achieve distinct separation of the plug 204 from the jack 202 is within the ranges set forth herein.

In another alternative of the advantageous embodiment described herein, the switching component 250 is a pressure switch 250c disposed in the plug 204 configured for engagement with a latch portion 226 of the plug 204. Again, an obvious variant, as mentioned herein, is a pressure sensor 250c disposed in the plug 204 configured for engagement with a latch portion 226 of the plug 204.

In operation, a method of preventing an arc between the contacts of a plug 204 an the contacts of a jack 202 in a PoE application (i.e., where a powered device is connected to a power source equipment) may include the steps of moving the plug 204, actuating a switch component 250 in response thereto so as to move the switching component 250 from a closed state to an open state, and de-energizing the electrical path in response to the actuating step before the energized contacts 212 of the jack 202 are disengaged from the contacts 222 of the plug 204. As set forth in this disclosure, this method also describes a control circuit 230 in electrical communication with an electrical power source 240 and an energized electrical path defined among the electrical power source, a pair of the plurality of contacts 212 in a jack 202 of the power source equipment 201, and a pair of the plurality of contacts 222 disposed on a plug 204 of the powered device 203 received within a receptacle 210 of the jack 202. The switching component 250 is in electrical communication with the control circuit 230 and is connected to the pair of the plurality of jack contacts 212. Preferably, the moving step includes moving a latch portion 226 of the plug 204 with respect to the jack 202, moving a body portion 224 of the plug 204 with respect to the jack 202, or any other type of relative movement there between. Certain types of switch components 250b and 250d may be advantageously used with respect to relative movement between the back wall 214 and the nose 228 of the plug 204, such as any that have been described herein or any other later developed structure that provides the intended functionality. Preferably, the de-energizing step is completed before the plug is moved 0.005 inches.

Figure 5:
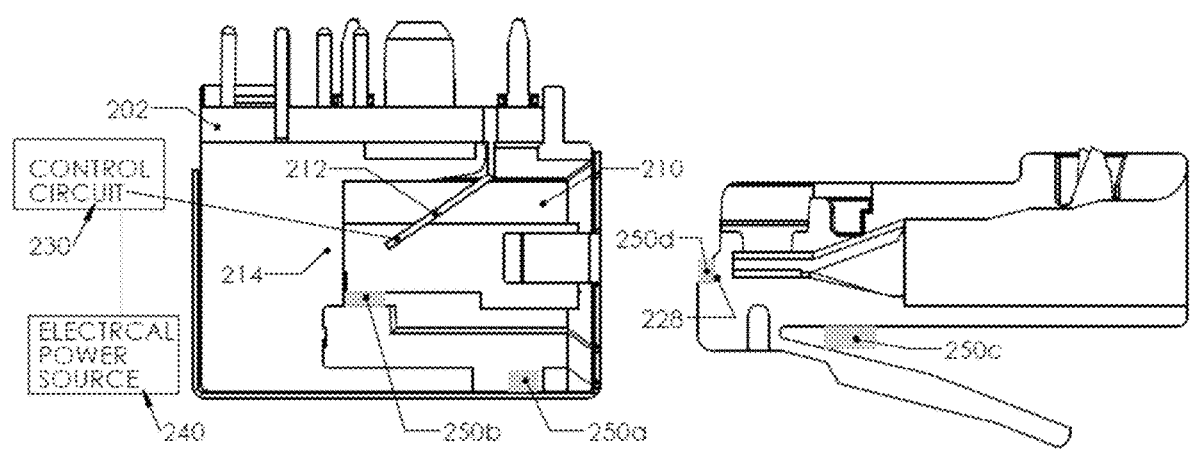
FIG. 5 depicts a side sectional view of a disconnected modular connectors.

FIG. 5 depicts two disconnected or separated modular connectors that may form a modular connector assembly when joined, as described herein. One of skill in the art will recognize a plug 204 on the left and a jack 202 on the right. In one embodiment, which is similar as described herein, which similarities will not be repeated for the sake of brevity, but shall address or fill in any inadequate description hereafter, including without limitation like structure and functionality regardless if reference numerals are provided, a modular connector includes a plurality of contacts in one of a jack 202 and a plug 204 that are configured to engage a corresponding complementary contact disposed on another of the jack 202 and the plug 204. A pair of the contacts in the one of the jack 202 and the plug 204 are energizable by connection to an electric power source 240 and configured to facilitate an energized electrical path when engaged with the other of the jack 202 and the plug 24. A switching component 250 is in electrical communication with the pair of contacts such that the pair of contacts is de-energized when the switching component 250 is disposed in an open state. The switching component 250 is closed when the plug 204 is matingly received within the receptacle 210 and is responsive to movement of the plug 204. All other alternatives and additionally described components, elements, limitations or other items shall also be applicable to this embodiment likewise.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

Any other undisclosed or incidental details of the construction or composition of the various elements of the disclosed embodiment of the present disclosed concepts are not believed to be critical to the achievement of the advantages of the disclosed concepts, so long as the elements possess the attributes needed for them to perform as disclosed. Certainly, one skilled in the electrical and electronic arts would be able to conceive of a wide variety of alternative configurations and successful combinations thereof. The selection of these and other details of construction are believed to be well within the ability of one of even rudimental skills in this area, in view of the present disclosure. Illustrative embodiments of the present invention have been described in considerable detail for the purpose of disclosing a practical, operative structure whereby the disclosed concepts may be practiced advantageously. The designs described herein are intended to be exemplary only. The novel characteristics of the disclosed concepts may be incorporated in other structural forms without departing from the spirit and scope of the invention. The disclosed concepts encompass embodiments both comprising and consisting of the elements described with reference to the illustrative embodiments. Unless otherwise indicated, all ordinary words and terms used herein shall take their customary meaning as defined in The New Shorter Oxford English Dictionary, 2007 Sixth Edition. All technical terms shall take on their customary meaning as established by the appropriate technical discipline utilized by those normally skilled in that particular art area.

What is claimed:

1. An arc prevention system including:
  a jack having a receptacle;
  a modular plug sized to be positioned in the receptacle of the jack, the modular plug including:
  a plurality of contacts, with at least two of the contacts creating an energize electrical path with an external power source in electrical communication with the external power source;
  a latch extending from a top surface of the modular plug,
  a switching unit positioned on the latch,
  a control circuit in the modular plug that is in electrical communication with the switch and the at least two energized contacts,
  wherein,
  the switching unit is in electrical communication with the control circuit and not the energized electrical path,
  the control circuit adjusts the energized electrical path to a predetermined electrical level when the switch is disengaged.

2. The arc prevention system of claim 1, wherein the switching unit is a microswitch.

3. The arc prevention system of claim 1, wherein the switching unit is a pressure switch.

4. The arc prevention system of claim 1, wherein the switching unit is positioned on a top surface of the latch.

5. The arc prevention system of claim 1, wherein the switching unit is in a dosed state when the plug engages the receptacle of the jack.

6. The arc prevention system of claim 1, wherein the switching unit is positioned on the latch such that the switching unit enters an open state, when the plug is moved 0.01 inches or less.

7. The arc prevention system of claim 1, wherein the external power supply is a power over Ethernet power supply unit.

8. The arc prevention system of claim 1, wherein the switching unit is in an open state when the plug engages the receptacle of the jack.

9. The arc prevention system of claim 1, wherein the switching unit, via the control circuit, de-energizes the contacts when the latch is pushed towards the modular plug.

10. The arc prevention system of claim 1, wherein the switching unit is an infrared switch.

11. A method of preventing an arc, the method including the steps of:
- positioning a switching unit on an external surface of a modular plug, with the modular plug being sized to engage a receptacle in a jack;
- creating an energized path between at least two of a plurality of contacts in the modular plug and an external power source;
- forming a control circuit connected to the switching unit and not to the energized path;
- adjusting an electrical level of the energized path with the switching unit is disengaged.

12. The method of claim 11, wherein the switching unit is a microswitch.

13. The method of claim 11, wherein the switching unit is a pressure switch.

14. The method of claim 11, wherein the switching unit is positioned on a top surface of a latch on the modular plug.

15. The method of claim 11 wherein the switching unit is in a closed state when the plug engages the receptacle of the jack.

16. The method of claim 14, wherein the switching unit is positioned on the latch such that the switching unit enters an open state when the plug is moved 0.01 inches or less.

17. The method of claim 11, wherein the external power source is a power over Ethernet power supply unit.

18. The method of claim 11, wherein the switching unit is in an open state when the plug engages the receptacle of the jack.

19. The method of claim 11, including the step of de-energizing the contacts when the latch is pushed towards the modular plug.

20. The method of claim 11, wherein the switching unit is an infrared switch.

* * * * *